United States Patent [19]
Lynn et al.

[11] Patent Number: 5,745,699
[45] Date of Patent: Apr. 28, 1998

[54] DYNAMIC ADDRESS ASSIGNMENT IN AN ARBITRARILY CONNECTED NETWORK

[75] Inventors: Kerry Eugene Lynn, Redwood City; Alan Oppenheimer, Cupertino; Michael Walker Ritter, Los Altos; Jonathan Marcus Zweig, Cupertino; Jeffery L. Mullins, San Jose, all of Calif.

[73] Assignee: Apple Computer, Inc., Cupertino, Calif.

[21] Appl. No.: 733,540

[22] Filed: Oct. 18, 1996

Related U.S. Application Data

[63] Continuation of Ser. No. 126,313, Sep. 24, 1993, abandoned.

[51] Int. Cl.$^6$ ............................................. G06F 12/00
[52] U.S. Cl. ............................ 395/200.75; 395/200.54; 395/200.47
[58] Field of Search ............... 395/200.16, 85.13–85.16, 395/800, 200.5, 200.75, 200.53, 200.54, 200.57

[56] References Cited

U.S. PATENT DOCUMENTS

| | | | |
|---|---|---|---|
| 4,881,074 | 11/1989 | Reichbauer et al. | 370/94.1 |
| 5,034,882 | 7/1991 | Eisenhard et al. | 395/650 |
| 5,150,464 | 9/1992 | Sidhu et al. | 396/200.1 |
| 5,282,270 | 1/1994 | Oppenheimer et al. | 395/200 |
| 5,287,498 | 2/1994 | Perelman et al. | 395/600 |
| 5,331,634 | 7/1994 | Fischer | 370/85.13 |
| 5,388,213 | 2/1995 | Oppenheimer et al. | 395/200 |
| 5,410,543 | 4/1995 | Seitz et al. | 370/85.13 |
| 5,425,028 | 6/1995 | Britton et al. | 370/94.1 |
| 5,517,618 | 5/1996 | Wada et al. | 395/200.15 |
| 5,526,489 | 6/1996 | Nilakantan et al. | 395/200.02 |
| 5,539,736 | 7/1996 | Johnson et al. | 370/60 |
| 5,603,086 | 2/1997 | Cree et al. | 370/341 |

OTHER PUBLICATIONS

David B. Johnson, "Transparent Internet Routing for IP Mobile Hosts", Carnagie Mellor University, 11 Jul. 1993 pp. 1–23.

Joh Ioannidis et al, "IP–based Protocols for Mobile Internetworking", Columbia Univ CS Department, SIGCOMM 91 1991 pp. 1–17.

Fumio Teraoka et al, "Host Migration Transparency in IP Networks", ACM SIGEOMM, Computer Communication Review, 1993.

Fumio Teraoka et al, "A Network Architecture Providing that Migration Transperency" Sony Computer Science Labs. Inc., SCSL–TR–91–004, May 1991 pp. 1–12.

Richard Stevens, "TCP/IP Illustrated, vol. 1", Addison–Wesley Publishing Co. Jan 1994 pp. 53–68.

*Primary Examiner*—Mehmet B. Geckil
*Attorney, Agent, or Firm*—Blakely, Sokoloff, Taylor & Zafman

[57] ABSTRACT

A method and apparatus for assigning a unique network address to a first node within a network which is arbitrarily connected. The first node may include a shared network resource, such as a networked printer device, or a modem, in addition to a stand-alone computer system. The network may include a network which is wireless, wherein various nodes comprise radio transceiver circuitry, including radio frequency modems. A first provisional network address for use in assigning the unique network address is determined by the first node. The first node broadcasts probes containing the provisional network address until a first probe response to one of the probes is received or a first interval of time elapses. If the first probe response to one of the probes is received, then the first node determines a second provisional network address and repeats selection of the address and broadcasting, until no probe response is received in the first interval of time. Using the first provisional network address, the first node broadcasts forward probes in the network until a second probe response to one of the forward probes is received by the first node or a second period of time has transpired. If a second probe response to one of the forward probes is received by the first node, then the first node determines a third provisional network address and repeats the steps of selecting, broadcasting probes and forward probes until no the response is received in the second interval of time. The final provisional network address may be used as the unique network address for the first node.

41 Claims, 13 Drawing Sheets

| Acquirer's | | Probe number | Immediate sender's hardware address |
|---|---|---|---|
| Hardware address | Tentative address | | |
| | | | |
| | | | |
| | | | |
| | | | |
| | | | |
| | | | |
| | | | |
| | | | |

701 702 703 704

PROBE FORWARDING TABLE

Figure 7

DYNAMIC ADDRESS ASSIGNMENT IN AN ARBITRARILY CONNECTED NETWORK

This is a continuation of application Ser. No. 08/126,313, filed Sep. 24, 1993, now abandoned.

BACKGROUND OF THE INVENTION

1. Field of the Invention

The present invention relates to methods and apparatus for assigning unique network addresses to nodes in a wireless networking system or in a networking environment where the connectivity between nodes is not direct and can be changing over time. More specifically, the present invention relates to a sequence of communication between nodes so that one node may dynamically assign itself a unique address, including the request and response packets which are used in a networking system for address acquisition and also including methods and apparatus for transmitting and receiving the packets to control the network node address acquisition process.

2. Background Information

The advent of local area networks (LANs) have enabled a variety of very powerful applications to be implemented. These applications include the capability to transfer information between nodes in the system, including, but not limited to, files, commands, or other data. This has enabled capabilities such as file sharing, messaging and the control of other nodes in the network.

Instead of hardwired networks as is common in prior art systems, wireless networks have recently been proposed. The details of the implementation of such a wireless network will not be discussed here, however, such systems typically comprise transmitter and receiver (transceiver) circuitry, control circuitry for interfacing with the network and for controlling the transceiver, and a radio frequency modem (MOdulator/DEModulator) for transmitting signals to and receiving signals from other nodes in the network.

A primary distinction between wireless LANs and conventional (wired) LAN is that wireless LANs are not necessarily "fully connected." That is, on a wired LAN it is assumed that every node can directly communicate with every other node. This is often not the case for wireless LANs. Specifically, for three nodes A, B, and C, it is often the case that A and B can directly communicate, and B and C directly can communicate, but A and C cannot directly communicate, e.g., they may be out of range of the radio transmissions of each other. In order for A and C to communicate, they must relay messages through node B. This is known as the "hidden node problem" since nodes A and C are effectively "hidden" from each other except for the indirect link through node B. It is desired in some circumstances that A and C communicate in this environment with one another through the intermediate node B. U.S. Pat. Nos. 4,661,902, 4,689,786, 5,150,464 and Ser. No. 07/534,154, filed Jun. 6, 1990, now U.S. Pat. No. 5,282,270 all of which are assigned to Apple Computer, Inc., the assignee of the present invention, describe typical prior art wired networking environments which incorporate novel methods of assigning unique addresses, so that communication between nodes in a LAN may take place. The address assignment methods and apparatus described in these patents do not work in the wireless or partially connected environment due to the hidden node problem. Therefore, for wireless networking environments, novel techniques and apparatus must be used in order to allow unique network addresses to be assigned to nodes.

The hidden node problem may not pose a problem for communication between nodes if two nodes A and C are not able to communicate with one another at all, even indirectly (through intermediate nodes). That is, if A and C have the same network address, this will not pose a problem if A and C cannot directly or indirectly communicate with one another. However, if nodes A and C can both communicate with a third node B, allowing indirect communication, the problem becomes significant. In this situation, if B desires to communicate with A or C, if A and C have the same network node address, then B will not be able to differentiate between them, and the communication link with A and/or C may fail. In addition, wireless networking systems have other problems unique to wireless systems because hidden nodes may appear or disappear depending upon operating circumstances within the network. In other words, wireless networking systems have the feature that connectivity may change as nodes within the system move in and out of range of each other, transmissions become obstructed, etc. If nodes are able to move, however, they may move out of range of one node, and into the range of another. A network that has indirect or direct, possibly changing connectivity we define as an "arbitrarily connected" network. In this circumstance, after address acquisition, node A may move close enough to node C so that direct communication between the two becomes possible. In this case, it is important that both nodes have non-conflicting addresses, otherwise communication between them can be disrupted. Thus, prior art methods of assigning unique network addresses to nodes pose substantial disadvantages in partially connected environments including wireless LANs.

SUMMARY AND OBJECTS OF THE PRESENT INVENTION

One of the objects of the present invention is to provide a method for dynamically assigning a unique network address to a node in an arbitrarily connected networking system.

Another of the objects of the present invention is to allow a node in a wireless networking system to assign itself a unique network address even when it cannot directly communicate with all of the other nodes in the system.

Another of the objects of the present invention is to allow nodes in a wireless networking system which can indirectly communicate with one another to dynamically acquire unique network addresses.

Another of the objects of the present invention is to allow nodes in a wireless networking system which has connectivity between nodes that changes over time to assign themselves unique network addresses.

Another of the objects of the present invention is to allow nodes in a wireless networking system to assign themselves unique network addresses even when other nodes are performing these operations simultaneously.

These and other objects of the present invention are provided for by a method and apparatus for assigning a unique network address to a first node within a network which is arbitrarily connected. In various embodiments of the present invention, the first node may include a shared network resource, such as a networked printer device, or a modem, in addition to a stand-alone computer system. In certain other embodiments of the present invention, the network may include a network which is wireless, wherein various nodes comprise radio transceiver circuitry, including radio frequency modems. A first provisional network address for use in assigning the unique network address is determined by the first node. The first node broadcasts probes containing the provisional network address until a first probe response to one of the probes is received or a first interval of time has transpired. If the first probe response to one of the probes is received, then the first node selects a second provisional network address and repeats the attempted acquisition of the address, until no probe response is received in the first interval of time. Using the first provisional network address, the first node broadcasts forward probes in the network until a second probe response to one of the forward probes is received by the first node or a second period of time has transpired. If the second probe response to one of the forward probes is received by the first node, then the first node determines a third provisional network address and repeats the steps of selecting, broadcasting probes and forward probes until no the response is received in the second interval of time. Finally, the first provisional network address may be used as the unique network address for the first node.

Other objects, features and advantages of the present invention will be apparent from viewing the figures and the description which follows below.

BRIEF DESCRIPTION OF THE DRAWINGS

The present invention is illustrated by way of example and not limitation in the figures of the accompanying in which like references indicate similar elements and in which:

FIG. 7 shows an example of an AARP probe forwarding table (APFT) which is maintained by a node in a networking system for keeping track of forward probe packets which are transmitted by the node.

DETAILED DESCRIPTION

Methods and apparatus for dynamically assigning a unique network address to a node in an arbitrarily connected networking system are described. In the following description, for the purposes of explanation, various specific embodiments are set forth describing specific packet formats, system configurations, circuits, signals, steps, etc. in order to provide a thorough understanding of the present invention. It will be apparent to one skilled in the art, however, that the present invention may be practiced without these specific details. In other instances, well known circuits and devices are shown in block diagram form in order to not unnecessarily obscure the present invention.

Overall Communication

Figure 1:
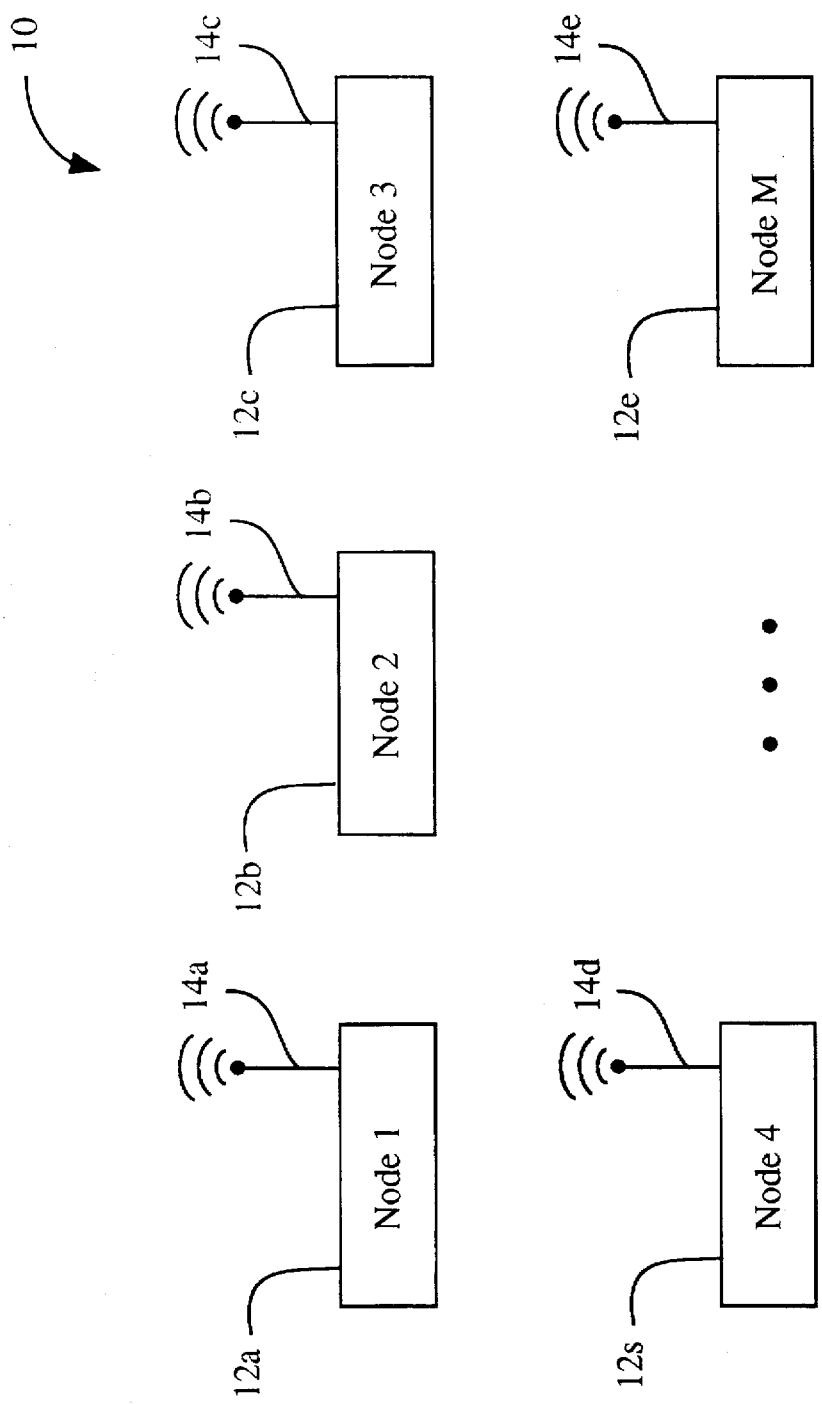
FIG. 1 illustrates a wireless communication system in which certain embodiments of the present invention may be implemented.

Reference is made to FIG. 1 which illustrates a decentralized environment including a plurality of independent nodes 10 which may be a complete wireless networking system. The collection of nodes 10 include a first node 12a that has an antenna 14a, a second node 12b that has an antenna 14b and so forth, up to an Mth node 12e that has an antenna 14e. Each node 12a–12e may comprise a stand-alone computer, a peripheral (e.g., a printer), or any networked resource or device to which communication may be useful along with associated communication circuitry. Although only five nodes are illustrated in FIG. 1, for many applications the number of nodes (M) is expected to be in the range of 2–32. However, it will be apparent that in other embodiments many more nodes can be accommodated; i.e., M can be very large.

Definitions

Figure 2:
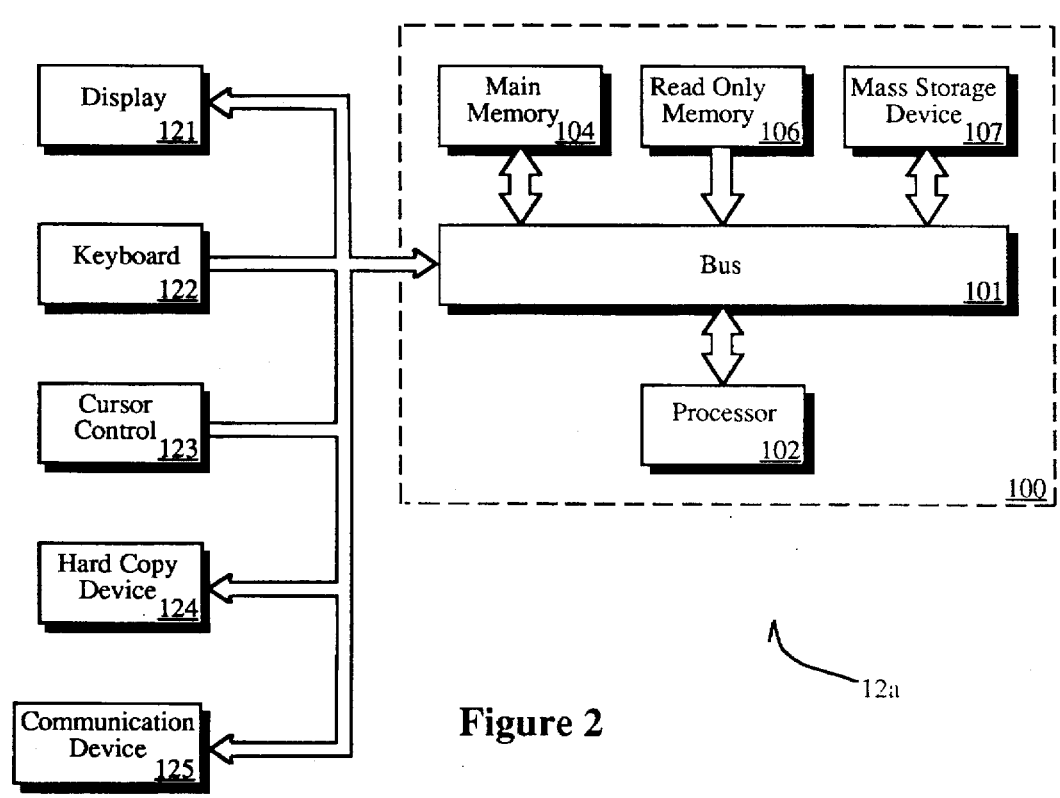
FIG. 2 is a block diagram of circuitry contained within a single node in a networking system which enables communication to and from the node.

Referring to FIG. 2, a system upon which one embodiment of a node (e.g., 12a of FIG. 1) of the present invention is implemented is shown as 100. 100 comprises a bus or other communication means 101 for communicating information, and a processing means 102 coupled with bus 101 for processing information. System 100 further comprises a random access memory (RAM) or other volatile storage device 104 (referred to as main memory), coupled to bus 101 for storing information and instructions to be executed by processor 102. Main memory 104 also may be used for storing temporary variables or other intermediate information during execution of instructions by processor 102. System 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. System 100 may further be coupled to a display device 121, such as a cathode ray tube (CRT) or liquid crystal display (LCD) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys, coupled to bus 101 for communicating direction information and command selections to processor 102, and for controlling cursor movement on display 121. Another device which may be coupled to bus 101 is hard copy device 124 which may be used for printing instructions, data, or other information on a medium such as paper, film, or similar types of media. In the described embodiments, another device which is coupled to bus 101 is a communication device 125 which is a means for communicating with other nodes. This communication device may include a radio frequency modem and antenna, a transceiver and associated control circuitry for communicating with other nodes in the network. Note, also, that any or all of the components of system 100 and associated hardware may be used in various embodiments, however, it can be appreciated that any configuration of the system that includes a processor 102 and a communication device 125 may be used for various purposes according to the particular implementation.

In one embodiment, system 100 is one of the Macintosh® family of personal computers such as the Macintosh® Powerbook™ or Macintosh® Performa™ brand personal computers manufactured by Apple® Computer, Inc. of Cupertino, Calif. (Apple, Macintosh, Powerbook, and Performa are trademarks of Apple Computer, Inc.). Processor 102 may be one of the 68000 family of microprocessors, such as the 68030 or 68040 manufactured by Motorola, Inc. of Schaumburg, Ill.

Note that the following discussion of various embodiments discussed herein will refer specifically to a series of routines which are generated in a high-level programming language (e.g., the C++ language available from Symantec of Cupertino, Calif.) and compiled, linked, and then run as object code in system 100 during run-time. It can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

In various embodiments of the present invention a computer system 100 may also be any of a number of devices typically used within a networking environment, such as a computer processing unit node as is illustrated, including as associated processor, mass storage device, and display, or it may be any number of network shared resources typically used in a networking environment such as printers, modems, file servers, or other dedicated apparatus. For example, for a shared resource such as a networked printer, the configuration of the system may be much simpler, lacking such elements as display 121, keyboard 122, cursor control 123 and mass storage device 107. In this case, system 100 will act as a dedicated network controller of hardcopy device 124 and will simply pass data from messages received from communication device 125, such as print jobs received from other nodes. In this instance, the printer will have the necessary buffering circuitry, control circuitry, media handling mechanisms, for instance, sheet feeders or carriages, and corresponding control circuitry, and will also have the requisite image forming mechanisms, such as scanning and fusing mechanisms as is typically used in prior art laser printers, or impact mechanisms, such as printheads, along with the associated control circuitry. This control circuitry may then operate upon data, such as print jobs, received from system 100. It can be appreciated by one skilled in the art, that any other type of networking resource may be used in conjunction with the system 100 illustrated in FIG. 2 for communicating within the networking environment as is illustrated in FIG. 1, in an implementation-dependent configuration.

Figure 3A:
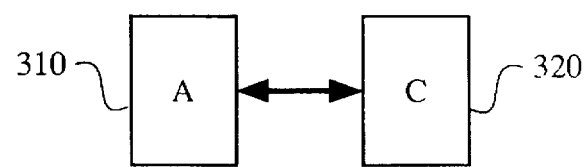
FIGS. 3a and 3b illustrate direct and indirect connectivity between various nodes in a networking system.

As described in the background, above, the primary distinction between wired networking systems and wireless networking systems is that certain nodes in an arbitrarily connected system may not be able to directly communicate with one another. This may also be true in certain wired environments. Communication between nodes may be performed indirectly by relaying packets between intermediate nodes. This is briefly illustrated with reference to FIGS. 3a and 3b. For example, in FIG. 3a, communication between nodes A 310 and C 320 is provided via direct communication. In an arbitrarily connected networking system, nodes A 310 and C 320 are within range of each others' transceivers so that the two nodes may pass messages directly.

Figure 3B:
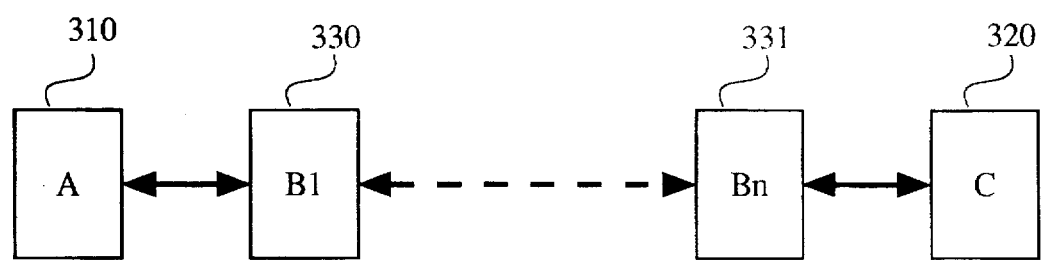

In contrast, a situation which may occur in a typical wireless networking system includes the indirect connectivity illustrated in FIG. 3b. In this example, nodes A 310 and C 320 are communicating via a series of intermediate nodes $B_1$ through $B_n$, 330 and 331. The transceivers of A 310 and C 320 are out range of one another's transceiver. Communication is directly provided between A 310 and node $B_1$ 330, and C 320 is directly communicating with $B_n$ 331. A series of intermediate nodes between $B_1$ 330 and $B_n$ 331 may be traversed by packets containing messages in order to provide indirect communication between nodes A 310 and C 320. Each of the nodes between $B_1$ 330 and $B_n$ 331, inclusive, which are directly communicating with one another in order to provide this indirect communication between nodes A 310 and C320 are known as "intermediate nodes".

Some other definitions are in order before proceeding. First, an "independent node" is a node which has acquired its own network node address in isolation without any direct connectivity between it and with any other node. A "functioning LAN" is an arbitrarily connected local area network on which all nodes have acquired unique network addresses. This may consist of a single independent node. For the remainder of this application, the mechanisms described here will address the circumstance where nodes in a LAN may provide direct or indirect communication with one another. The goal of the mechanisms described here is to create a functioning LAN where all communication is not necessarily direct.

Also, for the remainder of this application, the term "connectivity distance" between two nodes A and C is the smallest number of intermediate nodes required to provide connectivity between A and C. Two directly connected nodes have a connectivity distance equal to zero. All nodes within any certain connectivity radius n of node A are those nodes with a connectivity distance of n or less from A. Lastly, a "forward probe" packet is a new type of packet to be described below which is used for determining whether any nodes not directly connected to the acquiring node are using the tentative address. The "immediate sender" of a forward probe is the node that the forward probe was sent from and is the node to where probe responses are forwarded.

Overview

The network node address acquisition process will be described in detail below. To briefly summarize, however, a node will initially try to use an address which is stored in its pRAM (parameter ram—a dynamic memory which is continuously supplied power and retains its contents from session to session), and use a mechanism similar to that described in Applicant's prior patents known as the AppleTalk® Address Resolution Protocol (AARP) to initially assign itself a unique network address. (AppleTalk® is a registered trademark of Apple Computer, Inc.). The node broadcasts AARP probe packets, requesting that any node hearing the probe respond if it has already acquired that network address. For the remainder of this application the term "broadcast" will refer to the use of that term as applied in the field of radio broadcasting, not as used in the prior art wired networking literature which discuss a "broadcast" address. As will become apparent, and as discussed in the assignee's prior patents, AARP packets are in fact sent to a network "multicast" address to limit the pool of receiving nodes to a certain limited, finite number, and the term "broadcast" in the context of this application does not refer to the use of the term as the "broadcast" address for AARP. If no response is received within a number of transmitted probes over a fixed time interval, this tentative node network address is used for the further verification of a unique network address as described below. If a response is received, the acquiring node selects another random tentative network node address and restarts the entire process. The AARP process is implemented in the ISO/OSI model at a level between the Data Link and Transport layers in order to dynamically convert a network address used in the higher level stacks to a globally unique hardware address of a particular node on the LAN.

After the tentative or provisional node address is acquired, as described above, the assigned address becomes the new tentative address for a subsequent process. The acquiring node uses intermediate nodes to send a new type of AARP probe packet to other nodes to insure that nodes within a desired connectivity radius also have not been assigned the tentative network address. This allows nodes in an arbitrarily connected wireless LAN to take advantage of the mobile aspects of wireless LANs. During this process, each of the intermediate nodes act as rebroadcasters of both the acquirer's probes and, if any conflicts are detected, as forwarders of the responding node's response, if any. In a sense, each node in an arbitrarily connected wireless local area network is analogous to a "bridge" in certain prior art wired networking systems. However, there are important distinctions between the wired environment and the arbitrarily connected environment which will be described here. This will become apparent as more details of the implemented embodiments of this invention are illustrated below. In these implemented embodiments nodes within the network need not implement the "age on probe" optimization of AARP as was typical in prior art-wired LAN's. This optimization may degrade the efficiency of the described mechanisms.

Detail of Node Address Acquisition

Figure 4A:
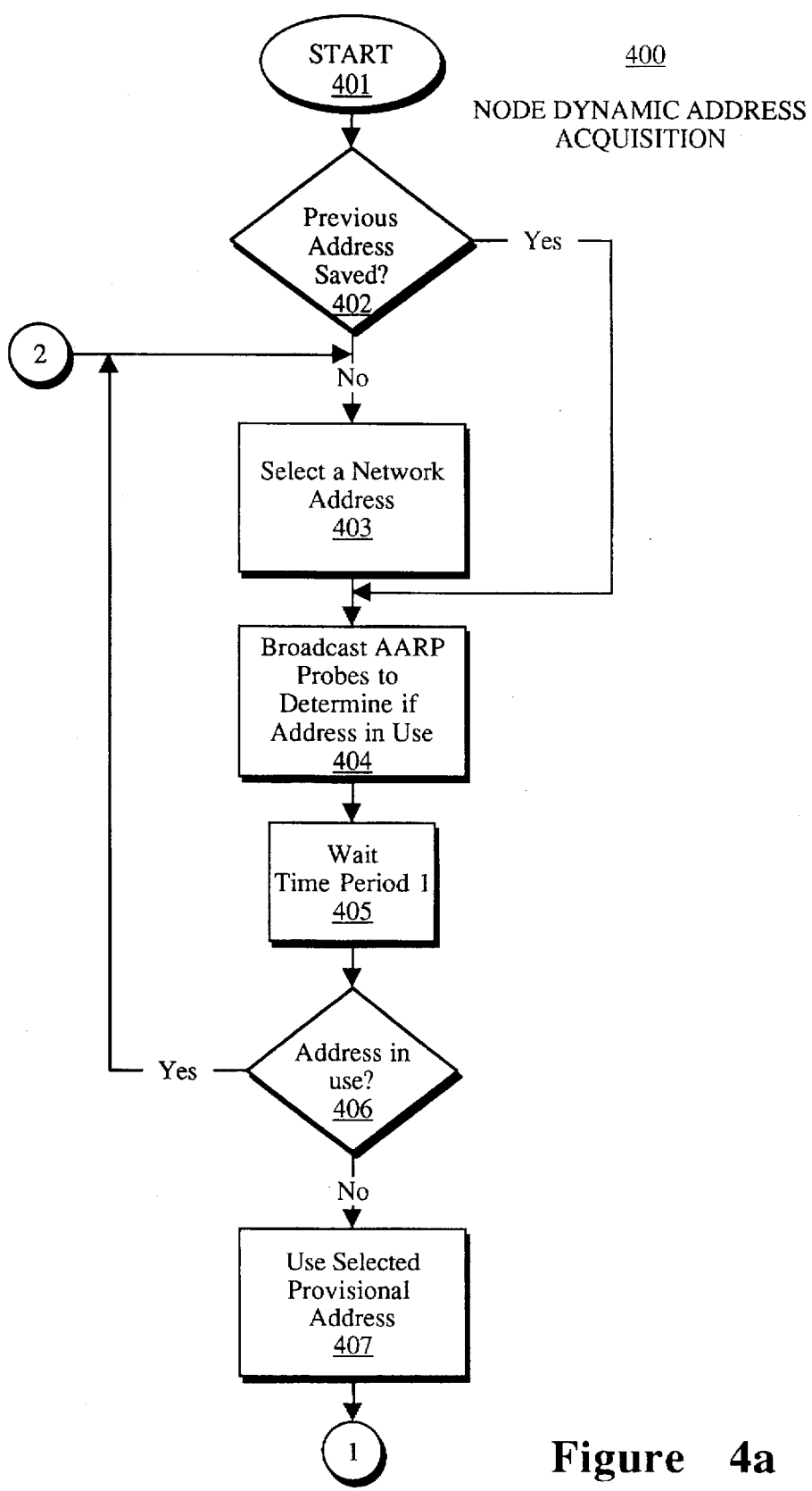
FIGS. 4a and 4b illustrate a process used by a node in a networking environment for assigning itself a unique network address.

The detailed process steps for performing node address acquisition in an environment which is not "fully connected" will now be discussed with reference to the remaining figures. The node dynamic address acquisition process is illustrated as process 400 in FIGS. 4a and 4b. This process may be implemented as a series of process steps in a typical fashion within a node 12a by a suitably programmed general purpose computer. Alternatively, these steps may be implemented using a series of discrete electronic components which perform the illustrated process steps in the illustrated sequence. At any rate, a typical process for node dynamic address acquisition 400 will start at a typical process entry point 401 as is illustrated in FIG. 4a. Then, it is determined, at step 402, whether a previous network address has been saved. As is described in Assignee's prior patents, a previous network address will have been saved in a typical area such as pRAM within a system 100 if the node had in a previous session acquired a unique network address. In this case, the node uses this "guess" about a unique network address for its tentative address, and process 400 continues at step 404. If, however, a previous network address has not been saved as detected at step 402, then some arbitrary node number is selected at step 403. Because the wireless network in this embodiment of the present invention operates in a non-extended fashion, only the node number is iterated upon to arrive at a unique network address and the network number is not modified in any way as is described in the assignee's prior patents.

Once a node number has been selected at step 403, or the previous saved address has been retrieved at step 402, then at step 404, AARP probes are transmitted to all the nodes having a connectivity distance of zero from the acquiring node (that is, all nodes that are directly connected to the acquiring node, or within range of its transmitter) to determine if the tentative address selected is in use by any of those nodes. The AARP probe packet used by the node for this step is illustrated as packet 500 of FIG. 5a.

Figure 5A:
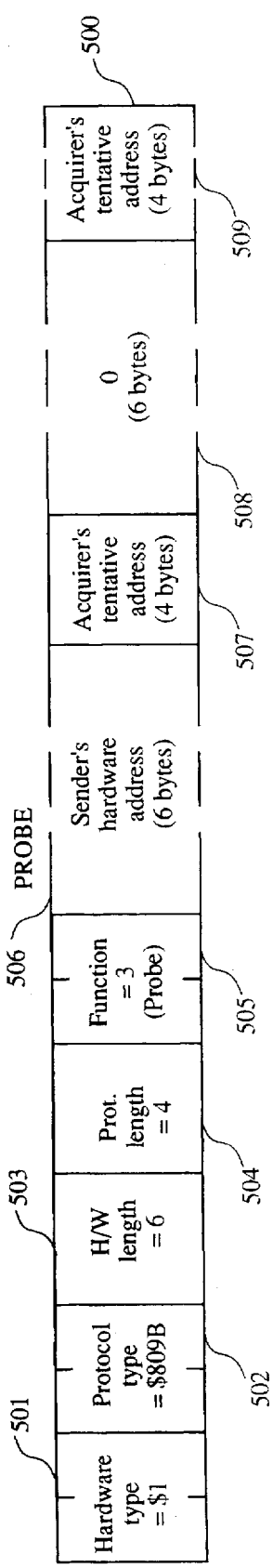
FIGS. 5a and 5b show examples of packets which are transmitted by nodes in a networking system in various embodiments of this invention.

The AARP probe packet 500 illustrated in FIG. 5a contains several fields identifying both the hardware address and the desired network address of the acquiring node. For example, field 501, a two-byte field, contains the hexadecimal value $1 (note that for the remainder of this application any hexadecimal values are preceded by the dollar sign "$"). The protocol type field which is a two-byte field 502 contains the value $809B identifying the protocol for which this packet is intended. The hardware address length field 503 contains 6. In addition, field 504 of the protocol length equals 4 (indicating the length of the protocol packet), and the function field 505 (two-bytes) contains the value 3 indicating that the packet is a "probe" packet. The packet further contains the acquiring node's hardware address (a six-byte value) in field 506, and the acquiring node's tentative network address (a four-byte value) in field 507. The next 6 bytes contain a zero in field 508, and field 509 contains the acquiring node's tentative network address in field 509.

Figure 9A:
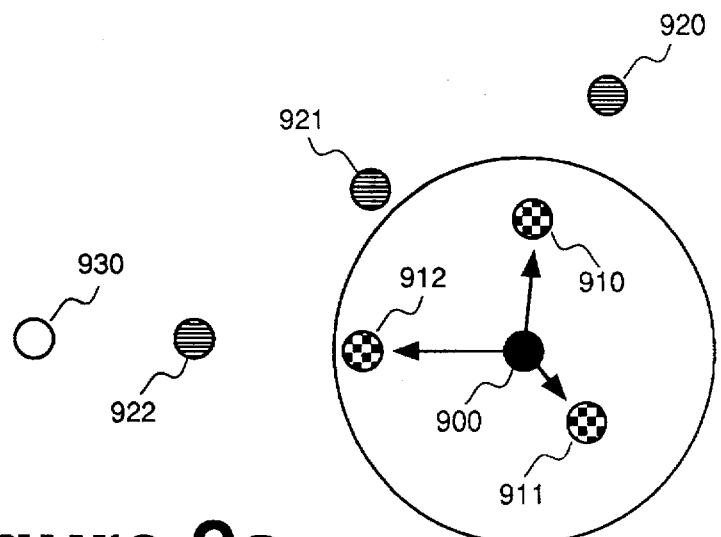
FIGS. 9a through 9d illustrate an example of the transmission and forwarding of forward probe packets within a wireless networking system, the various radii to which each packet is transmitted and the path taken by responses to such forward probe packets.

The AARP probe packets are broadcast at step 404 to and received by all nodes having the connectivity radius of zero with the acquiring node (those nodes which are all directly connected to the node desiring to acquire the address as illustrated in FIG. 9a). The process of responding to these probes will be discussed in more detail below, however, each of the nodes receiving the AARP probe packet 500 determines whether it has the network address which the node seeks to acquire. After transmission, the node waits an implementation-dependent time period 1 at step 405 to allow any responses to be received, and then loops back to 404 and sends and waits for more probe responses. If the address is in use as detected at step 406, that is, the acquiring node receives an AARP response packet (e.g. packet 620 of FIG. 6 of the assignee's prior U.S. Pat. No. 5,150,464), then, step 406 returns to step 403 to select another network address. This process continues iteratively at steps 403 through 406, until a unique tentative network address is obtained by the acquiring node.

Once a unique provisional network address is determined by the acquiring node which is not currently in use by nodes directly connected to the acquirer, as detected at step 406, the selected provisional or tentative network address is used by the node at step 407, as the tentative network node address for the remaining steps of the process. The remainder of process 400 for dynamic node dynamic address acquisition is continued at step 408 of FIG. 4b.

Figure 4B:
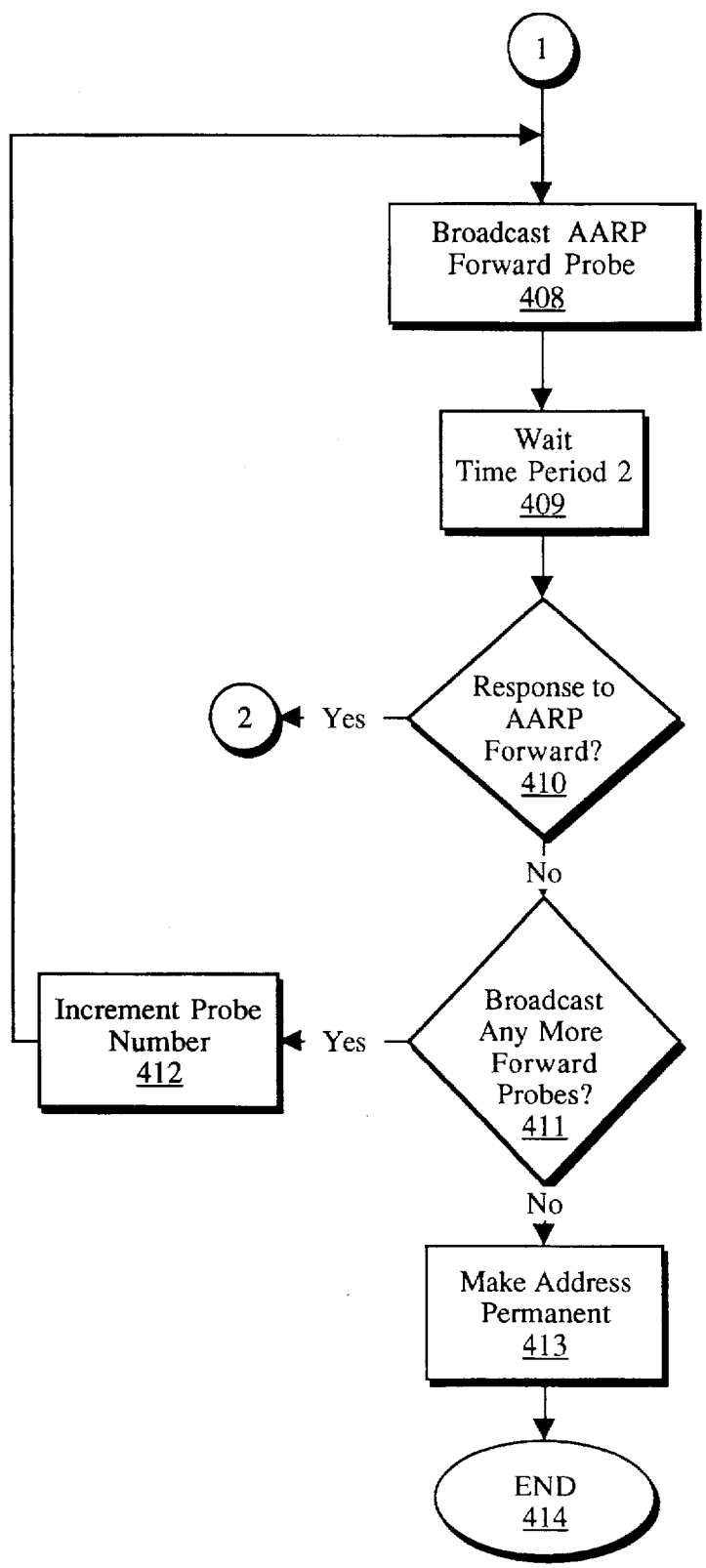

Process 400 continues at step 408 of FIG. 4b. Once the provisional or tentative address is ascertained and established at step 407, then a series of AARP "forward" probes is broadcast at step 408. The AARP forward probe packet is illustrated as packet 550 of FIG. 5b. The AARP forward probe packet is used for determining whether any nodes within a certain connectivity radius of the acquiring node have the tentative address, or are connected to any nodes which have the tentative address. Thus, the probe packet contains a "radius remaining" field 559 illustrated in FIG. 5b, which on a first iteration is initially set low to limit the packet traffic in the network and is eventually set to the desired connectivity radius with which the node wishes to communicate with other nodes and finally is set to a value greater than the number of nodes allowed on a single network to guarantee a functioning arbitrarily connected LAN. This radius remaining field 559 is decremented by each node which receives and subsequently rebroadcasts the forward packet 550 to any node with which it can directly communicate. Once the radius remaining field 559 reaches zero, then the packet is no longer rebroadcast by any nodes receiving the packet.

The remaining fields of the forward probe packet 550 are similar to those used in the other AARP packets such as probe packet 500 illustrated in FIG. 5a, and/or the other AARP packets described in the Assignee's prior patents. For example, field 551 (a two-byte field) contains $1 indicating the hardware type. Moreover, the protocol type is equal to $809B (a two-byte field). The hardware length field 553 is equal to 6, and the protocol length field 554 is equal to 4. The function field 555 (a two-byte field), contains the value 4 which identifies the packet as a forward probe packet. The packet also contains a six-byte field 556 for the sending node's hardware address (e.g., a node which has rebroadcast forward probe packet 550).

The forward probe packet also contains a field 557 known as the "probe number" which is used for limiting the rebroadcast of a given forward probe by a node to exactly one time. As will be discussed in more detail with reference to FIG. 4b, the probe number is incremented each time a forward probe packet is broadcast by the acquiring node. New forward probe packets are broadcast by the acquirer a number of times as determined by field 558. The probe number makes each transmission of the forward probe packet 550 unique so other nodes won't rebroadcast any given probe more than once. This makes the process linearly scalable and hence feasible for networks with a large number of nodes. At any rate, upon an initial probe by the acquiring node, the probe number is set to one, and prior to each re-transmission, the probe number is incremented by the acquiring node, and transmitted in the packet at field 557. Also, as discussed before, probe packet 550 contains a field 559 (a one-byte field), which is the connectivity "radius remaining" value. The field is initially set on an implementation-dependent basis by the acquiring node and determines the maximum connectivity radius to which it wishes the probe packet to be rebroadcast. As the packet is received and re-transmitted by each subsequent node in the chain of nodes during the AARP forward probe process, the radius remaining field 559 is decremented by each node which receives and rebroadcasts the packet. This will be discussed in more detail below with reference to FIGS. 6a through 6c.

Finally, the AARP forward probe packet 550 contain three fields 560, 561, and 562. Field 560, a one-byte field, is currently reserved and contains zero. Field 561 is a six-byte field in which the acquiring node's hardware address is stored. Finally, the four-byte field 562 contains the acquiring node's tentative network address, with which the acquiring node wishes to assign itself. This is used by receiving nodes in the address acquisition process to determine whether the network address has already been assigned to another node.

At any rate, once the AARP forward probe packet 550 has been broadcast at step 408, with the initial probe number, maximum probe number, and radius remaining fields 557 through 559 set, the node waits an implementation-dependent time period 2 at step 409 for any responses to the AARP forward probe packet to be received. If a response to the AARP forward probe packet is received at step 410, then the address acquisition process must start again at step 403 of FIG. 4a to select another node number. This is because if a response is received within time period 2, then another node in the LAN is currently using the selected tentative address. Therefore, the acquiring node must select another tentative address and perform the previously described steps all over again. At any rate, if no responses within time period 2 to the AARP forward packet are detected at step 410, then at step 411, it is determined whether any more probes should be broadcast. That is, the acquiring node broadcasts a new AARP forward probe packet a specified number of times until the maximum number of probes is reached. The implementer of the process must set the maximum number of probes and the current number of probes values appropriately according to implementation circumstances. At any rate, if any more probes should be sent as detected at step 411 (probe number<maximum probe number) then the probe number is incremented at step 412, and stored in the probe number field 557 of packet 550. Then, process 400 returns to step 408 to transmit a new AARP forward probe packet 550.

Once all the AARP forward probe packets have been transmitted, as detected at step 411, and no responses have been received (as detected at step 410), then the selected network tentative address is made permanent at step 413. This step is implemented in the same manner as in well-known in prior art address acquisition techniques, such as described in the assignee's prior patents. That is, the address then can be stored into a non-volatile storage area, such as pRAM, so that upon reinitialization of the node, the tentative address has already been selected, and step 403 may be skipped upon a first iteration of the process. At any rate, the dynamic node address acquisition process for the acquiring node is then complete step 414, and the process may exit, for example, at a typical process exit point.

Detail of Receipt of an AARP Forward Probe

The process which a node executes upon receiving an AARP forward probe packet 550 as transmitted by an acquiring node at step 408 in FIG. 4b, is illustrated with reference to process 600 of FIGS. 6a through 6c. At any rate, upon the receipt of an AARP forward probe packet via an interrupt or other similar mechanism in the receiving node, the process (e.g. an interrupt handler) will commence at a typical process entry point such as at step 601 of FIG. 6a. Then, it is determined at step 602 whether the receiving node has the same network address as which the acquiring node is attempting to acquire. This network address, as discussed previously, was transmitted in field 562 of the AARP forward probe packet 550 illustrated in FIG. 5b.

If the receiving node has the same network address as in the AARP forward probe packet, as detected at step 602, then a series of steps are taken to determine whether the receiving node should prevent the acquiring node from obtaining the selected tentative network address. At step 603, it is determined whether the receiving node is in the address acquisition phase, that is, performing process 400 illustrated in FIGS. 4a through 4b, when the interrupt occurred. If so, then the node which sent the AARP forward probe packet is given priority, and the node which received the AARP forward probe packet must restart its node address acquisition process, at step 604. The node receiving the AARP forward probe packet must restart its own process 400 and select another tentative address to use. Then, step 604 leads to step 616 illustrated in FIG. 6c, a typical process exit point, to exit from the AARP forward probe packet receive process 600.

If, however, the node is not in the address acquisition phase as detected at step 603, then the receiving node responds to the immediate sender with the receiver's own hardware address at step 605. Because the forward probe packet may have been rebroadcast from other intermediate nodes (if the receiving node is not directly connected to the acquiring node), the receiving node sends an AARP response packet (e.g. packet 620 of FIG. 6 of the assignee's prior U.S. Pat. No. 5,150,464), to indicate that the network address is already in use by the receiving node. Because the packet may have been rebroadcast by several intermediate nodes, the response will only be sent to the immediate sending node of the forward probe. As will be discussed in more detail below, as probes are rebroadcast by intermediate nodes, the hardware address of each of the immediate sending nodes from which each AARP forward probe packet 550 has been received is stored in the AARP Forwarding Probe Table (APFT) for responses to that forward probe. The process will then exit at step 616 of FIG. 6c, a typical process exit point.

Figure 6A:
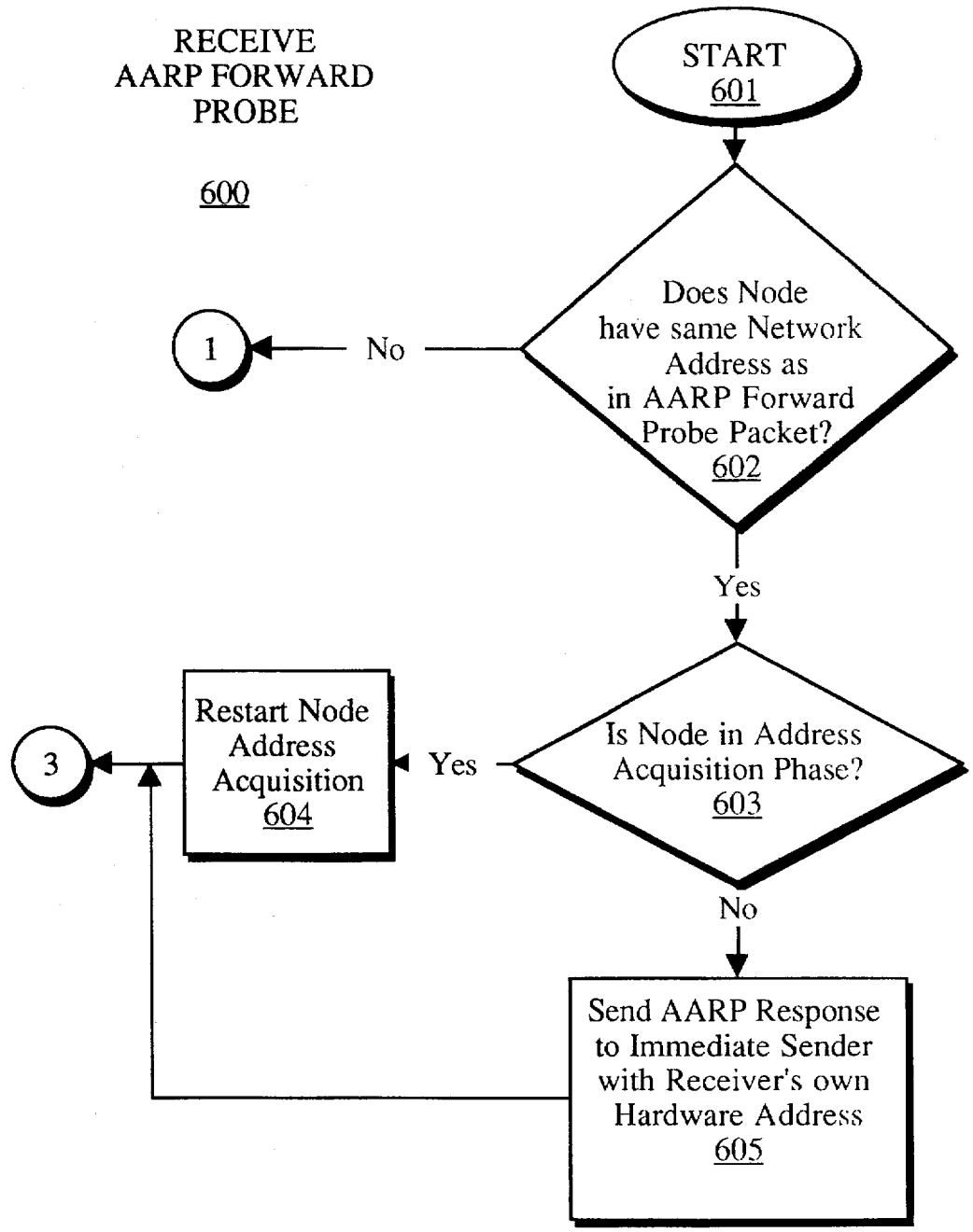
FIGS. 6a through 6c illustrate a process which is performed by a node which receives an address resolution protocol (AARP) forward probe packet from a node assigning itself a unique network address within the networking system.
Figure 6B:
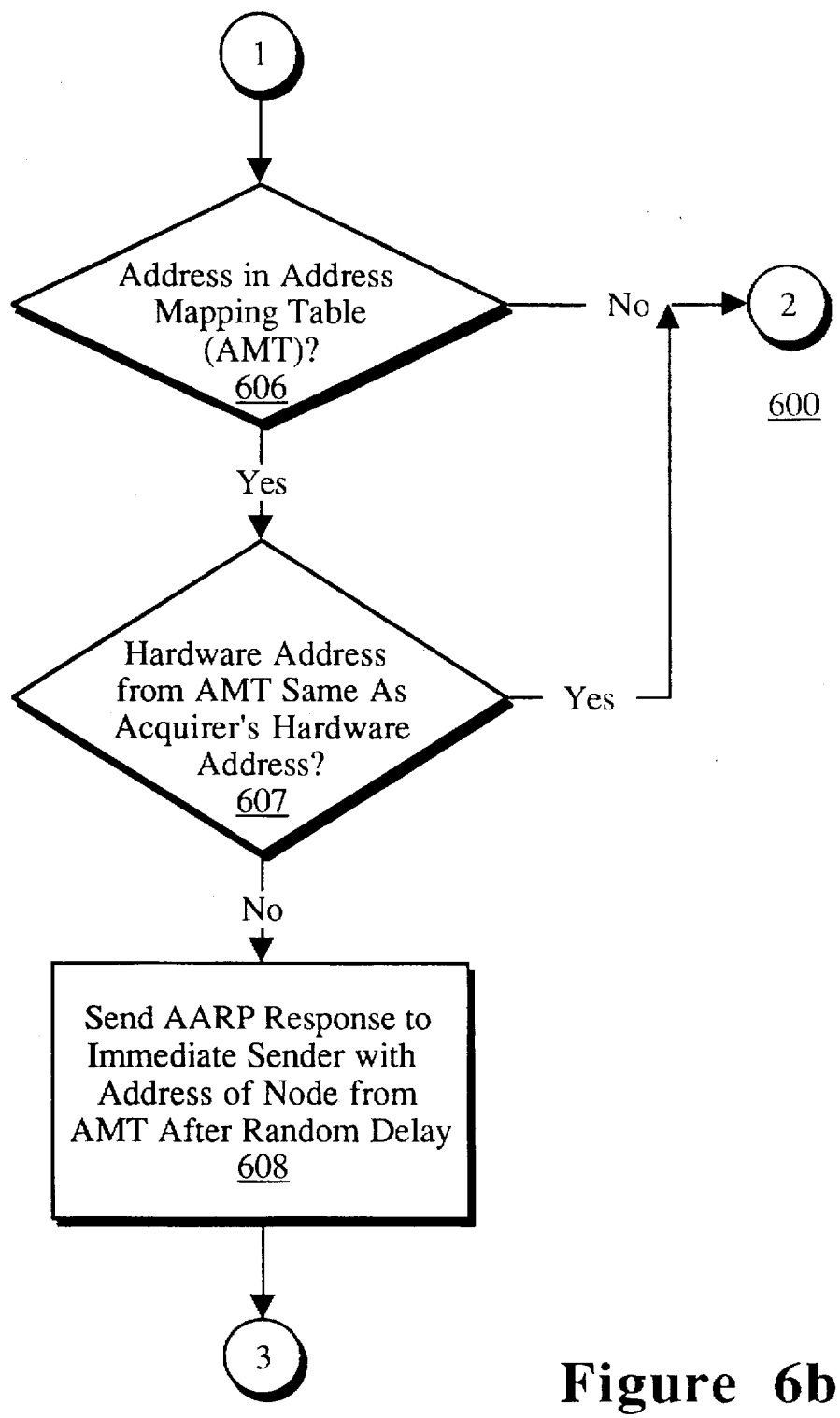

If, however, the receiving node does not have the same address as in the AARP forward probe packet as detected at step 602, then process 600 proceeds to step 606 of FIG. 6b. The receiving node then determines whether the address requested by the acquiring node (specified in the AARP Forward Probe packet) is stored in the receiving node's address mapping table (AMT). The address mapping table, as described in the assignee's prior patents, is a table maintained by each node to map hardware addresses of nodes to assigned network addresses. Thus, if the received network address is in the AMT for the receiving node, then the node has been communicating with a node which already has the desired network address. To allow indirect connectivity and prevent conflicts, this must not be allowed to occur. Process 600 proceeds to step 607. At step 607, it is determined whether the hardware address from the AMT is equal to the acquirer's hardware address. If not, (the hardware address from the AMT is not equal to the acquirer's hardware address as detected at step 607) then an AARP response is sent to the immediate sender after a random delay. The purpose of the random delay is to avoid collisions among simultaneous responses which may not be detected in a wireless network. The response contains the network and hardware address of the node retrieved from the AMT at step 608. It has now been determined that the receiving node has an entry in its AMT which is equal to the tentative address, indicating that the receiving node is communicating with a node which has already acquired the same network address as that requested by the acquiring node. Step 608 then proceeds to step 616 of FIG. 6c, a typical process exit point.

Figure 6C:
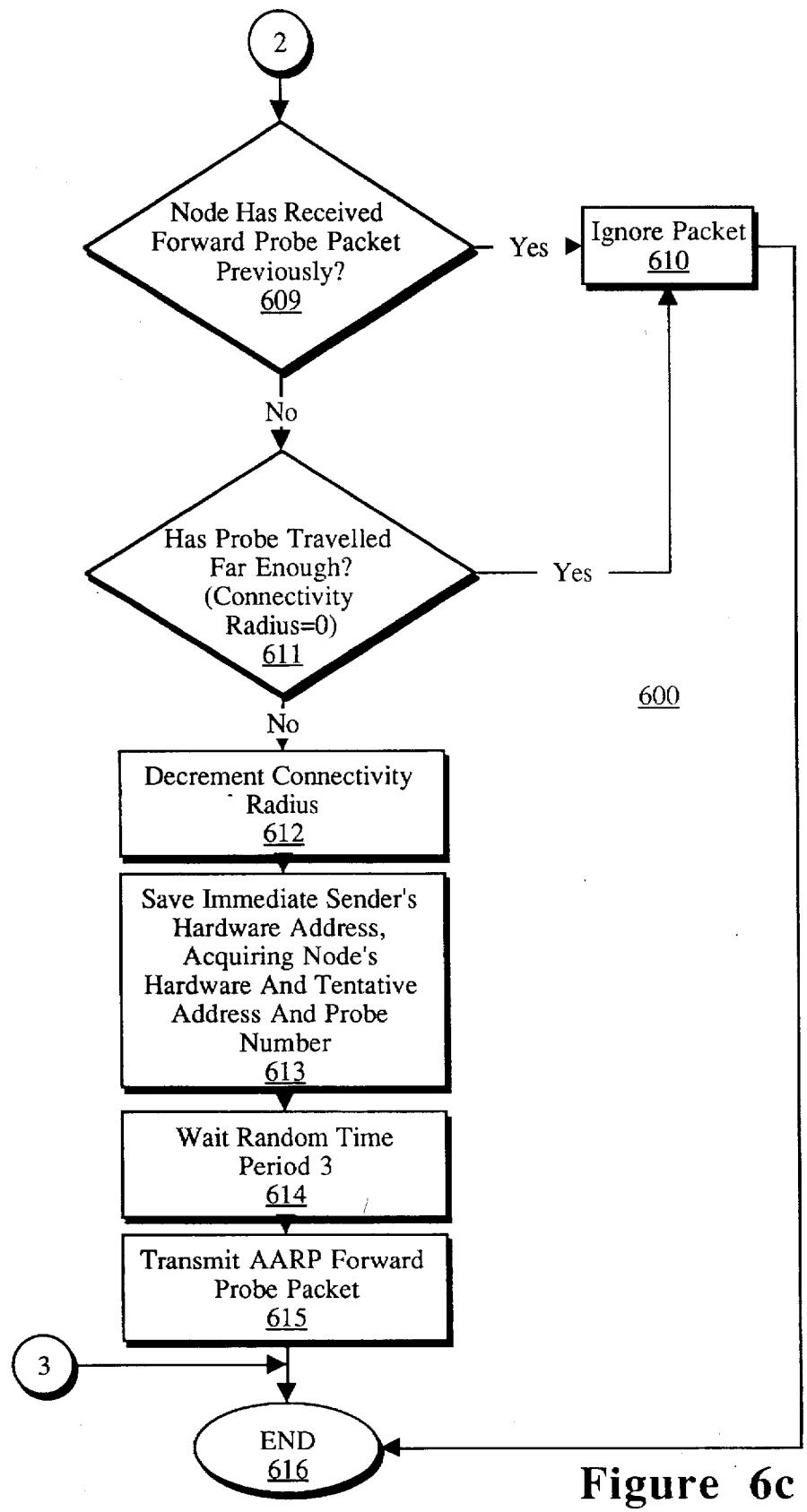

If, however, the hardware address from the AMT is equal to the acquirer's hardware address as detected at step 607 or the address was not in the AMT as detected at step 606, then process 600 proceeds to step 609 of FIG. 6c. At step 609, it is determined whether the receiving node has received this particular forward probe packet previously. In order to accomplish this, the receiving node will reference an internally stored table known as the Probe Forwarding Table, illustrated as 700 in FIG. 7, to determine whether the received forward probe packet has been received previously by the node. Probe Forwarding Table 700 will now be discussed with reference to FIG. 7.

Figure 5B:
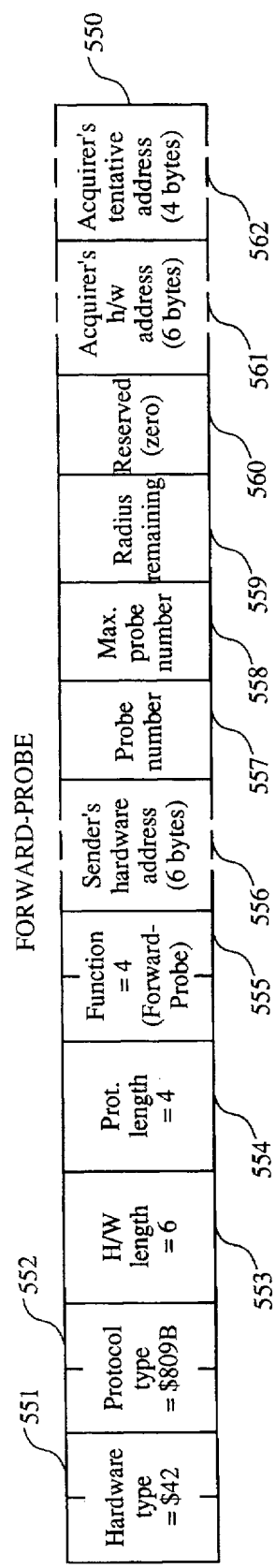

As forward probe packets, such as 550 of FIG. 5b, are received and rebroadcast by receiving nodes, various information from the packet is stored in Probe Forwarding Table 700. This is so that the receiving nodes of subsequent forward probe packets may determine whether the packet has been previously received, such as from another node with a direct or indirect connection with either the acquiring node or the receiving node, and so that the receiving node may transmit AARP responses to the immediate sender of an AARP forward probe. Upon the receipt and forwarding of forward probe packets, a receiving node stores the hardware address and the tentative network address requested by the acquiring node in fields 701 and 702. These are retrieved from fields 561 and 562 of forward probe packet 550. In addition, the probe forwarding table 700 contains a field 703 for storing the probe number of the forward probe packet, which is stored in field 557 of forward probe packet 550 illustrated in FIG. 5b. The probe number used should be a unique number for the particular entry having the specific hardware and tentative address stored in the table from the forward probe packet and is referenced so that the receiving node can determine whether the particular packet has been received previously, such as from another node having a direct or indirect connection with the receiving node. This is used at step 609 of FIG. 6c for determining whether the receiving node has received the same forward probe packet previously. If so, the packet is ignored such as at step 610 of FIG. 6c. Also, the immediate sender's hardware address is stored at field 704 of table 700. This is so that when an AARP response to a particular AARP forward probe packet is received, the receiving node may forward that AARP response packet back to the immediate sender's hardware address for transmission, ultimately, back to the acquiring node.

Various optimizations of the use of probe forwarding table 700 may be implemented in nodes in order to minimize the amount of rebroadcasting of forward probes where unnecessary, and to minimize the number of responses sent. For example, if two nodes can determine how close they are to each other (for instance by the use of a minimum connectivity radius to provide communication with one another), the two nodes can alternate which one rebroadcasts an AARP forward probe. Also, nodes very close to the acquiring node or a previous forwarded node, could only rebroadcast a certain number of the probes, not every probe received. Other heuristic techniques may be used based on the number of entries in the AMT, the amount of traffic on the network as received by the node, etc., and can be applied to create a probability function which determines whether the forward probe packet should be forwarded or not. At any rate, the remaining steps in process 600 of FIG. 6c are shown for illustration purposes only, and it can be appreciated by one skilled in the art that other methods not departing from the spirit and scope of the present invention may be used in these processes for determining whether a given receiving node forwards the packet or not, to minimize network traffic. The remaining steps of process 600 illustrated in FIG. 6c will now be discussed.

As already discussed, step 609 of FIG. 6c determines whether the forward probe packet has been heard before (e.g., by referencing the probe number entry for a particular acquiring node's hardware and tentative address in probe forwarding table 700 of FIG. 7). If so, then process 600 leads to step 610, wherein the packet is ignored, and the process proceeds to 616 of FIG. 6c, a typical process exit point. If, however, the receiving node has not received the forward probe packet previously as detected at step 609, then it is determined at step 611 whether the probe has traveled to its maximum radius. It is therefore determined whether the value stored in the connectivity radius remaining field of the forward probe packet now equals zero (e.g., at field 559 of the packet 550 illustrated in FIG. 5b). If so, then process 600 proceeds to step 610 which also ignores the packet, and then a typical process exit point 616 is proceeded to, as illustrated in FIG. 6c.

If, however, the forward probe packet has not been received previously and the forward probe packet has not traveled to its maximum radius (as determined by viewing the probe number or connectivity radius remaining fields at steps 609 and 611), then the forward probe packet should be broadcast to the next set of nodes with which the receiving node has direct communication. Thus, at step 612, the connectivity radius remaining value stored in field 559 is decremented and stored in the new forward probe packet to be broadcast. The immediate sender's hardware address, the associated acquiring node's hardware and tentative addresses, and the probe number of the packet-are also all stored in an entry in table 700 at step 613 of FIG. 6c. Then, a forward probe packet with the appropriate modifications of the connectivity radius remaining and the immediate sender's hardware address in field 556, which the receiving node sets to its own hardware address, is broadcast at step 615 illustrated in FIG. 6c. Note that the broadcast of the AARP forward probe packet at step 615 is performed after a wait of a random time interval of an implementation-dependent time period 3 at step 614 to allow for multiple nodes receiving the packet to broadcast the forward probe packet at different times. This is to minimize the likelihood of collision of the forward probe packet if two nodes receive and rebroadcast the forward probe packet simultaneously. A simultaneous transmission of a packet results in a "collision" which prevents receiving nodes from "hearing" the packet. The wait of a random time interval at step 614 makes this less likely to occur. Then, the forward probe packet receipt and forward process is thus complete at step 616, and the process terminates at a typical process exit point.

Detail of Receipt of an AARP Probe Response

Figure 8:
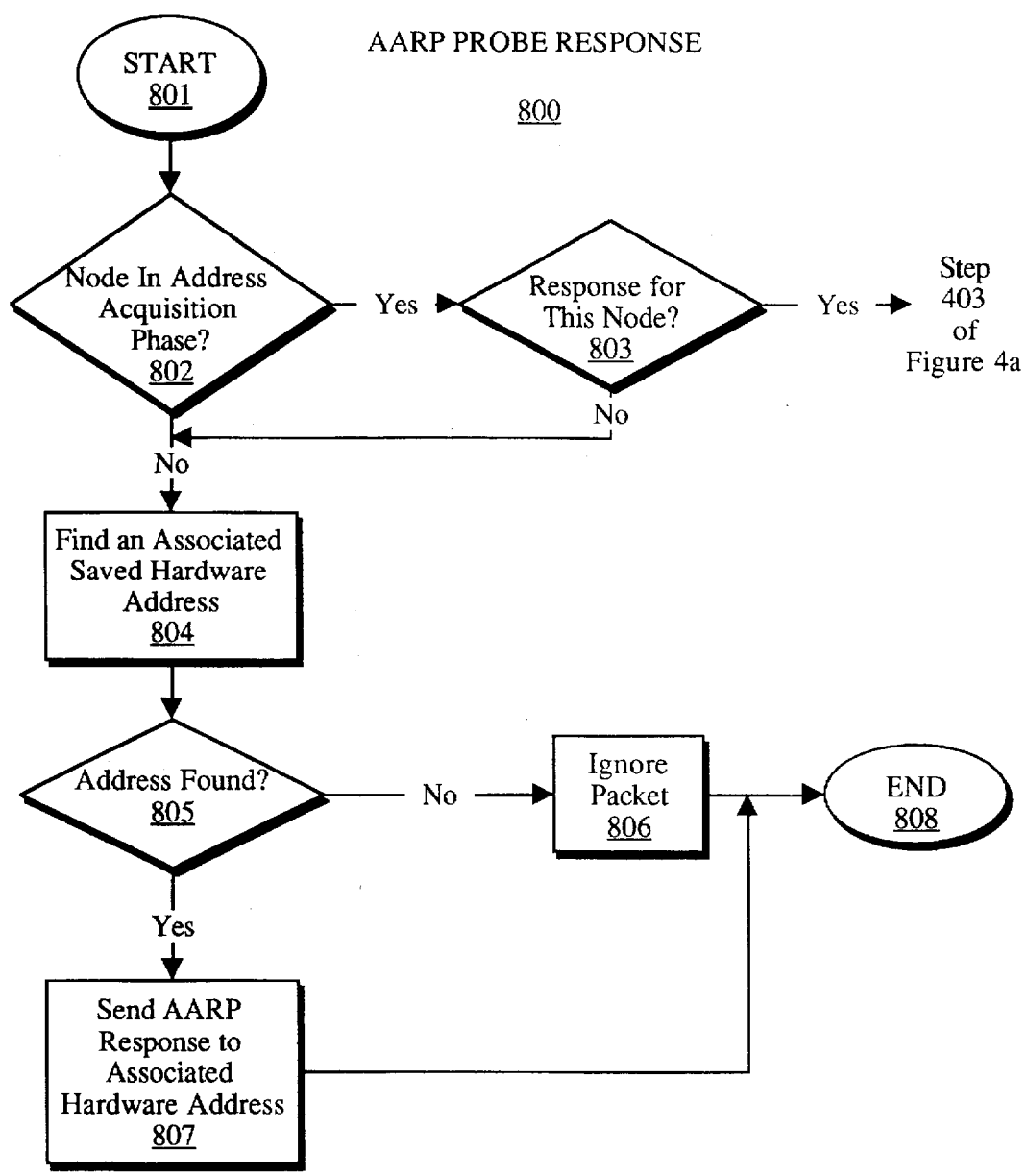
FIG. 8 illustrates a process performed by a node which receives an AARP response packet.

The process for receipt of an AARP response packet is illustrated with reference to process 800 of FIG. 8. This process may be entered upon a detection of an interrupt or other similar mechanism within a node which indicates an AARP response packet has been received by the node. The process (e.g. an interrupt handler) commences at step 801, an appropriate process entry point. At step 802, it is determined whether the receipt of the AARP probe response has occurred while the node is in its own address acquisition phase (e.g., process 400). If so, then at step 803, it is determined whether the AARP response is for this node, that is, the hardware and tentative network address are equal to the hardware address for the receiving node, and the tentative address with which the node desires to assign itself. This may be detected at a step such as 406 (or 410) illustrated in FIG. 4a, during node address acquisition process 400. If so, then the node indicates at step 406 (or 410) that the address is in use, and the process then proceeds to step 403 to select another network address in process 400 of FIG. 4a. If, however, the node is not in the address acquisition phase as detected at step 802, or the response is not in response to the node's own AARP probe, as detected at 803, then at step 804, the receiving node finds an associated hardware address stored in forward probe table 700 so that it may forward the AARP probe response to the forward probe's immediate sender which originally transmitted the AARP forward probe with which the response is associated. If an address is not found in the AARP probe forwarding table 700 at step 805, then the packet is ignored at step 806, and the process terminates at step 808, a typical process exit point. If, however, the address is found at step 805 in forward probe table 700 illustrated in FIG. 7, then the AARP response is sent to the immediate sender of the AARP forward probe stored in the AARP probe forwarding table listed in field 701 of table 700 at step 807. This is so that the response returns to the immediate sender from which the AARP forward probe packet was originally received, which will in turn, forward the probe back to the node it received the probe from, and so on, until the forward probe response finally reaches the acquiring node (see FIG. 9d). Then, upon transmission of the AARP probe response at step 807, the process terminates at step 808 of FIG. 8, a typical process exit point.

Diagramatical Summary of Messages Transmitted

Figure 9B:
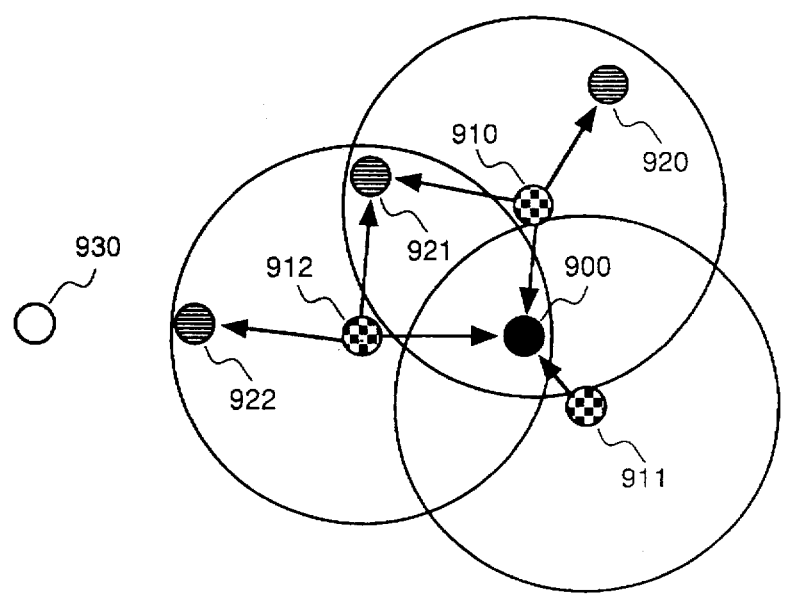

The broadcast and rebroadcast of forward probes and responses is summarized with reference to FIGS. 9a through 9d which illustrate the path taken by a forward probe packet during the probe forwarding process, and the path taken by the response to the forward probe during an example of a process for address acquisition. First, as is illustrated in FIG. 9a, an original forward probe packet is broadcast by an acquiring node 900, such as at step 408 of FIG. 4b. The forward probe packet is received by nodes 910, 911 and 912 all of which are directly connected (have a connectivity radius equal to zero) with node 900. Then, at a subsequent time interval, as illustrated in FIG. 9b, each of the nodes 910, 911, and 912 rebroadcast the AARP forward probe packet. The forward probe packets are then received by all nodes directly connected with each of these nodes (possibly multiple times). These include the original acquiring node 900, and nodes 920, 921, and 922. Because the original acquiring node 900 transmitted the original forward probe packet (determined by referencing its own forward probe table 700), the forward probe is ignored by that node. Other nodes also ignore multiple copies of the forward probe.

Figure 9C:
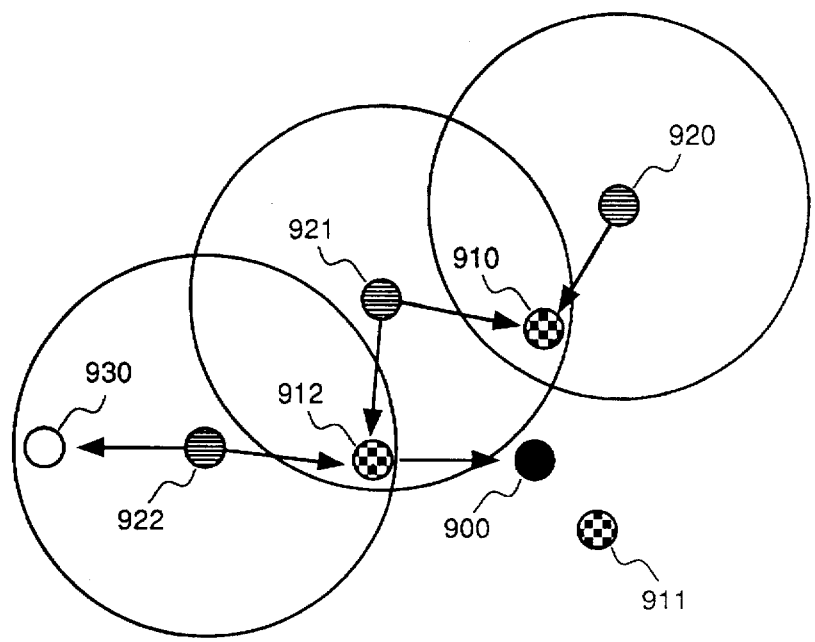

Then, at a subsequent time interval as illustrated in FIG. 9c, the receiving nodes 920, 921, and 922 also rebroadcast the forward probe packet to all nodes to which they are directly connected. These include, in this example, two nodes which previously forwarded the packet—910 and 912. This also includes, the node 930 which is directly connected to node 922.

Figure 9D:
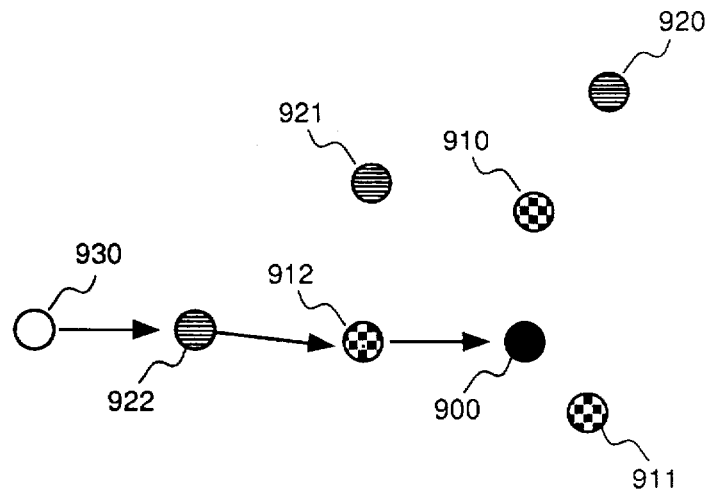

Then, upon a subsequent time interval as illustrated in FIG. 9d, node 930 detects that it either is already assigned the tentative network address sent in the forward probe packet (in field 562), or has an entry in its AMT for a node with the same tentative network address which acquiring node 900 desires to assign itself. Thus, node 930 sends an AARP response packet back to its immediate sending node 922. As indicated in its forward probe table 700, node 922 sends the AARP response back to its immediate sender 912, and node 912 sends the AARP response back to its immediate sender 900, the original acquiring node. Thus, the original acquiring node 900 detects that the address is in use (e.g., at step 410 of FIG. 4b), and the node knows to select another network address, and restart the address acquisition process. Note also that AARP responses are only sent to the immediate senders 922, 912, and 900, and not the other nodes which received the original AARP forward probe packet (e.g., nodes 910, 911, 920, and 921) by inserting the hardware address of each immediate sender of the forward probe in the AARP response, which is obtained by each node only referencing its own probe forward table 700. Thus, network traffic is kept to a minimum on sending of the AARP response packets, and all nodes within the desired connectivity radius may be checked to see if the tentative address is already in use. The random rebroadcast interval time period 3 specified at step 614 of process 600 also greatly improves the robustness of a partially connected network as different return paths will be tried at different times. Thus, this is a substantial improvement over the prior art which consists of schemes which are used in fully-connected networks.

Thus, using the mechanisms described above, a node may dynamically assign itself a unique network address within an arbitrarily connected local area networking environment, such as a wireless network. Although the present invention has been described specifically with reference to certain specific embodiments in FIGS. 1 through 9d, it can be appreciated by one skilled in the art that various departures and/or modifications may be made without departing from the overall spirit and scope of the present invention. It is also appreciated that other forwarding techniques may be used, other storage mechanisms may be used for forwarding packets, and/or other formats of probes, forward probes, and response packets may be used, in various embodiments of the present invention. Thus, specific embodiments described here are intended for illustrative purposes only, and the invention is only to be construed as limited by the appended claims which follow.

What is claimed is:

1. In a network comprising a first node and a second node in wireless communication, a method of assigning a unique network address within said network to said first node, comprising the following steps:
   a. said first node in said network determining a first provisional network address for use in assigning said unique network address;
   b. said first node broadcasting a first probe containing said first provisional network address until a first probe response to said first probe is received or a first interval of time has transpired;
   c. if said first probe response to said first probe is received, then said first node determining a second provisional network address and repeating steps b and c, said second provisional network address becoming said first provisional network address, until no said first probe response is received in said first interval of time;
   d. using said first provisional network address, broadcasting by said second node, a second probe in said network until a second probe response to said second probe is received by said first node or a second period of time has transpired, wherein said second probe comprises a forward probe that includes a radius remaining number indicating whether another node in said network may re-broadcast said forward probe;
   e. if said second probe response to said second probe is received, then said first node determining a third provisional network address and repeating steps b through e, said third provisional network address becoming said first provisional network address, until no said second probe response is received in said second interval of time; and
   f. using said first provisional network address as said unique network address for said first node.

2. The method of claim 1 wherein said first node comprises a shared network resource.

3. The method of claim 2 wherein said shared network resource comprises a networked printer.

4. The method of claim 1, wherein said forward probe further comprises a probe number indicating a number of times said forward probe has been broadcast.

5. The method of claim 1, wherein said forward probe further comprises a maximum probe number indicating a maximum number of times said forward probe may be broadcast.

6. In a network comprising a first node and a second node in wireless communication, a method of assigning a unique network address within said network to said first node, comprising the following steps:
   (1). said first node in said network determining a first provisional network address for use in assigning said unique network address:
   (2). said first node broadcasting a first probe containing said first provisional network address until a first probe response to said first probe is received or a first interval of time has transpired;
   (3). if said first probe response to said first probe is received, then said first node determining a second provisional network address and repeating steps b and c, said second provisional network address becoming said first provisional network address, until no said first probe response is received in said first interval of time,
   (4). using said first provisional network address, broadcasting by said second node, a second probe in said network until a second probe response to said second probe is received by said first node or a second period of time has transpired, wherein said second node further performs the following steps:
      a. receiving said second probe from a transmitting node;
      b. determining if said first provisional network address is in use by said second node, and if so, transmitting said second probe response to said transmitting node;
      c. if said first provisional network address is not in use by said second node, then said second node determining if said first provisional network address is in use by a third node which has communicated with said second node;
      d. if said first provisional network address is in use by said third node, then said second node transmitting said second probe response to said transmitting node including a hardware address of said third node;
      e. if said second probe has not been re-broadcast a maximum specified number of times, then storing a hardware address of said transmitting node and re-broadcasting said second probe;
   (5). if said second probe response to said second probe is received, then said first node determining a third provisional network address and repeating steps b through e, said third provisional network address becoming said first provisional network address, until no said second probe response is received in said second interval of time; and
   (6). using said first provisional network address as said unique network address for said first node.

7. The method of claim 6 further comprising the step of waiting a first random interval of time prior to re-broadcasting said second probe.

8. The method of claim 6 further comprising the step of waiting a second random interval of time prior to transmitting said second probe response to said transmitting node.

9. The method of claim 6 further comprising the steps of:
   a. receiving said second probe response to said second probe;
   b. retrieving said hardware address of said transmitting node; and
   c. re-broadcasting said second probe response to said hardware address of said transmitting node.

10. The method of claim 9 further comprising the step of waiting a third random interval of time prior to re-broadcasting said second probe response.

11. The method of claim 6 wherein said step of storing said hardware address of said transmitting node further comprises the step of storing said first provisional network address, and a hardware address of said first node in an entry wherein said hardware address of said transmitting node, said first provisional network address, and said hardware address of said first node are associated with one another.

12. The method of claim 6, wherein said determining step further comprises determining if said first provisional network address is in use by said second node, and if so, transmitting said second probe response to said transmitting node including a hardware address of said second node.

13. In a network comprising a first node and a second node in wireless communication, a method for determining a unique network address for said first node, comprising the following steps:
   a. said first node selecting a provisional network address and broadcasting a first signal to said second node until a unique provisional network address is determined for said first node;
   b. said first node broadcasting a second signal to said second node to determine if said unique provisional network address is being used by a third node which may exist in said network, wherein said second signal comprises a forward probe including a radius remaining number indicating whether said second node or another node may re-broadcast said forward probe;
   c. said second node broadcasting said second signal to said third node which may exist in said network to determine if said third node is using said unique provisional network address;
   d. if said third node which may exist in said network is using said unique provisional network address, then repeating steps a–c until it is determined that said third node is not using said unique provisional network address; and
   e. using said unique provisional network address as said unique network address.

14. The method of claim 13, wherein said first node comprises a shared network resource.

15. The method of claim 14, wherein said shared network resource comprises a shared network printer.

16. The method of claim 13, wherein said network comprises an arbitrarily connected network.

17. The method of claim 13, wherein said forward probe further comprises a probe number indicating a number of times said first node has broadcast said forward probe.

18. The method of claim 13, wherein said forward probe further comprises a maximum probe number indicating a maximum number of times said first node may broadcast the forward probe.

19. An apparatus in a network having a first, second, and third nodes in wireless communication, said apparatus determining a unique network address for said first node comprising:
   a. selection circuitry in said first node selecting a provisional network address and broadcasting a first signal to said second node directly connected to said first node until a unique provisional network address is determined for said first node;
   b. broadcast circuitry in said first node broadcasting a second signal to said second node to determine if said unique provisional network address is being used by said third nodes, if any, not directly connected to said first node, said second node comprising a forward probe including a radius remaining number indicating whether said third nodes, if any, in said network may re-broadcast said forward probe:
   c. receiver and broadcast circuitry in said second node re-broadcasting said second signal to said third nodes to determine if said third nodes are using said unique provisional network address;
   d. iteration circuitry in said first node iteratively activating elements a–c if said third nodes are using said unique provisional network address until it is determined that none of said third nodes are using said unique provisional network address;
   e. establishment circuitry using said unique provisional network address as said unique network address for said first node;
   f. first tables in said first, second and third nodes associating network and hardware addresses; and
   g. second tables in said first, second and third nodes associating a signal response with an immediate transmitter of said second signal.

20. The method of claim 1, wherein said network comprises an arbitrarily connected network.

21. A data processing apparatus comprising:
   selection circuitry selecting a provisional network address;
   receiver circuitry coupled to said selection circuitry and for coupling to an intermediate node which may exist in a network;
   broadcast circuitry coupled to said selection circuitry and for communicating in a wireless manner with said intermediate node which may exist in said network, said selection circuitry causing said broadcast circuitry to broadcast a first signal to said intermediate node until a unique provisional network address is determined for said data processing apparatus, said selection circuitry causing said broadcast circuitry to further broadcast a second signal to said intermediate node to determine if said unique provisional network address is being used by another node which may exist in said network, said second signal for causing a broadcasting of a third signal by said intermediate node to said another node which may exist in said network and for determining if said another node is using said unique provisional address, said second signal comprising a forward probe including a radius remaining number indicating whether said intermediate node or said another node may re-broadcast said forward probe, said data processing apparatus using said unique provisional network address as a unique network address if said intermediate node and said another node are not using said unique provisional network address.

22. The data processing apparatus of claim 21, wherein said data processing apparatus comprises a shared network resource.

23. The data processing apparatus of claim 22, wherein said shared network resource comprises a shared network printer.

24. The data processing apparatus of claim 21, wherein said forward probe further comprises a probe number indicating a number of times said selection circuitry causes said broadcast circuitry to broadcast said forward probe.

25. The data processing apparatus of claim 21, wherein said forward probe further comprises a maximum probe number indicating a maximum number of times said selection circuitry may cause said broadcast circuitry to broadcast said forward probe.

26. The data processing apparatus of claim 21, wherein said data processing node directly communicates with said intermediate node.

27. The data processing apparatus of claim 21, wherein data processing apparatus directly communicates with said another node.

28. The data processing apparatus of claim 21, wherein said data processing apparatus indirectly communicates with said another node through said intermediate node.

29. A data processing apparatus comprising:
   receiver circuitry for coupling to an acquiring node in a network; and
   broadcast circuitry coupled to said receiver circuitry and for communicating in a wireless manner with the acquiring node and another node in said network, said receiver circuitry for receiving a first signal from said acquiring node, said first signal for determining whether said data processing apparatus is using a network address of said acquiring node, said receiver circuitry further for receiving a second signal from said acquiring node, wherein said second signal comprises a forward probe including a radius remaining number indicating whether said forward probe may be re-broadcast by said data processing apparatus or by said another node, said second signal causing a broadcasting of a third signal by said broadcast circuitry to said another node, said third signal for determining whether said another node is using said network address of said acquiring node.

30. The data processing apparatus of claim 29, wherein said second signal is for determining whether said data processing apparatus is communicating with said another node which is using said network address.

31. The data processing apparatus of claim 29, wherein said data processing apparatus comprises a shared network resource.

32. The data processing apparatus of claim 31, wherein said shared network resource comprises a shared network printer.

33. The data processing apparatus of claim 29, wherein said forward probe further comprises a probe number indicating a number of times said acquiring node has broadcast said forward probe.

34. The data processing apparatus of claim 29, wherein said forward probe further comprises a maximum probe number indicating a maximum number of times said acquiring node may broadcast said forward probe.

35. The data processing apparatus of claim 29, wherein said data processing apparatus directly communicates with said acquiring node and said another node, and said acquiring node directly communicates with said another node.

36. The data processing apparatus of claim 29, wherein said data processing apparatus directly communicates with said acquiring and said another node, and said acquiring node indirectly communicates with said another node.

37. The data processing apparatus of claim 29, wherein said data processing apparatus further comprises a table communicating with said receiver circuitry and said broadcast circuitry, said table associating said forward probe with said acquiring node.

38. In a wireless network, a method of assigning a unique network address within said wireless network to a first node, comprising the following steps:
   a. said first node in said wireless network determining a first provisional network address for use in assigning said unique network address;
   b. said first node broadcasting a first probe containing said provisional network address until a first probe response to said first probe is received or a first interval of time has transpired;
   c. if said first probe response to said first probe is received, then said first node determining a second provisional network address and repeating steps b and c, said second provisional network address becoming said first provisional network address, until no said first probe response is received in said first interval of time;
   d. using said first provisional network address, broadcasting by a second node, a second probe in said wireless network until a second probe response to said second probe is received by said first node or a second period of time has transpired, wherein the second node is an arbitrary node in the wireless network and not a server or a bridge to another wireless network;
   e. if said second probe response to said second probe is received, then said first node determining a third provisional network address and repeating steps b through e, said third provisional network address becoming said first provisional network address, until no said first second response is received in said second interval of time; and
   f. using said first provisional network address as said unique network address for said first node.

39. A method in a wireless network for determining a unique network address for a first node, comprising the following steps:
   a. said first node selecting a provisional network address and broadcasting a first signal to a second node until a unique provisional network address is determined for said first node, wherein the second node is an arbitrary node in the wireless network and not a server or a bridge to another wireless network;
   b. said first node broadcasting a second signal to said second node to determine if said unique provisional network address is being used by a third node which may exist in said wireless network;
   c. said second node broadcasting said second signal to said third node which may exist in said wireless network to determine if said third node is using said unique provisional network address;
   d. if said third node which may exist in said wireless network is using said unique provisional network address, then repeating steps a–c until it is determined that said third node is not using said unique provisional network address; and
   e. using said unique provisional network address as said unique network address.

40. An apparatus in a wireless network, said apparatus determining a unique network address for a first node comprising:
   a. selection circuitry in a first node selecting a provisional network address and broadcasting a first signal to a second node directly connected to said first node until a unique provisional network address is determined for said first node;
   b. broadcast circuitry in said first node broadcasting a second signal to said second node to determine if said unique provisional network address is being used by third nodes, if any, not directly connected to said first node, wherein the second node is an arbitrary node in the wireless network and not a server or a bridge to another wireless network;
   c. receiver and broadcast circuitry in said second node re-broadcasting said second signal to said third nodes to determine if said third nodes are using said unique provisional network address;

d. iteration circuitry in said first node iteratively activating elements a–c if said third nodes are using said unique provisional network address until it is determined that none of said third nodes are using said unique provisional network address;

e. establishment circuitry using said unique provisional network address as said unique network address for said first node;

f. first tables in said first, second and third nodes associating network and hardware addresses; and g. second tables in said first, second and third nodes associating a signal response with an immediate transmitter of said second signal.

41. In a network comprising a first node and a second node in wireless communication, a method of assigning a unique network address within said network to said first node, comprising the following steps:

a. said first node in said network determining a first provisional network address for use in assigning said unique network address;

b. said first node broadcasting a first probe containing said first provisional network address until a first probe response to said first probe is received or a first interval of time has transpired;

c. if said first probe response to said first probe is received, then said first node determining a second provisional network address and repeating steps b and c, said second provisional network address becoming said first provisional network address, until no said first probe response is received in said first interval of time;

d. using said first provisional network address, transmitting by said second node, a second probe in said network until a second probe response to said second probe is received by said first node or a second period of time has transpired, said second probe comprising a forward probe including a radius remaining number indicating whether another node in said network may re-broadcast said forward probe;

e. if said second probe response to said second probe is received, then said first node determining a third provisional network address and repeating steps b through e, said third provisional network address becoming said first provisional network address, until no said second probe response is received in said second interval of time; and f. using said first provisional network address as said unique network address for said first node.

* * * * *